US012632029B2

(12) United States Patent
Albrile et al.

(10) Patent No.: US 12,632,029 B2
(45) Date of Patent: May 19, 2026

(54) METHOD OF MONITORING INDUSTRIAL PROCESSING PROCESSES, CORRESPONDING APPARATUS AND COMPUTER PROGRAM PRODUCT

(71) Applicant: PRIMA INDUSTRIE S.P.A., Collegno (IT)

(72) Inventors: Stefano Albrile, Collegno (IT); Andrea Bertaldi, Collegno (IT); Claudio Filippo Vitiello, Collegno (IT); Luigi Nobile, Collegno (IT); Valter Manuello, Collegno (IT)

(73) Assignee: PRIMA INDUSTRIE S.P.A., Collegno (IT)

( * ) Notice: Subject to any disclaimer, the term of this patent is extended or adjusted under 35 U.S.C. 154(b) by 585 days.

(21) Appl. No.: 18/028,841

(22) PCT Filed: Dec. 15, 2021

(86) PCT No.: PCT/IB2021/061751
§ 371 (c)(1),
(2) Date: Mar. 28, 2023

(87) PCT Pub. No.: WO2022/130228
PCT Pub. Date: Jun. 23, 2022

(65) Prior Publication Data
US 2023/0418257 A1    Dec. 28, 2023

(30) Foreign Application Priority Data
Dec. 16, 2020    (IT) ........................ 102020000031100

(51) Int. Cl.
*G05B 19/406* (2006.01)
*G06T 7/00* (2017.01)
*G06T 11/00* (2006.01)

(52) U.S. Cl.
CPC .......... *G05B 19/406* (2013.01); *G06T 7/0004* (2013.01); *G06T 11/00* (2013.01);
(Continued)

(58) Field of Classification Search
None
See application file for complete search history.

(56) References Cited

U.S. PATENT DOCUMENTS 7,523,011 B2 *  4/2009  Akiyama ................ G06F 18/00
702/66
8,558,135 B2 *  10/2013  Calefati ................. B23K 31/12
706/904
(Continued)

OTHER PUBLICATIONS

Shevchik, Sergey, et al. "Supervised deep learning for real-time quality monitoring of laser welding with X-ray radiographic guidance ". Scientific reports 10.1 (2020) 3389 (Year: 2020).*
(Continued)

*Primary Examiner* — Chikaodili E Anyikire
(74) *Attorney, Agent, or Firm* — Nixon & Vanderhye, PC

(57) ABSTRACT

A method of monitoring the state of industrial processing processes carried out by processing machines, in particular laser processing machines. The method comprises: sensing (30) a set of signals (R) representing parameters of the industrial process via a set of sensors (30), wherein sensed signals (R1, R2, R3) of the set of signals (R) comprise signals indicative of said industrial process that vary in time; applying to one or more sensed signals (R1, R2, R3) of the set of sensed signals (R) a classification operation (26) to obtain as a result at least one classification signal (Q) indicative of a state of said industrial process; providing said at least one classification signal (Q) to an interface unit (21) to control the state of processing of said industrial process; and representing (24) signals among the sensed signals (R1,
(Continued)

R2, R3) by applying a respective representation (242, 244, 246) of a set of representations (24) based on the membership of the signals among the sensed signals (R1, R2, R3) in a respective subset defined in said set of sensed signals (R) to produce corresponding digital images (Rhf, RIf, Rcf) that represent said sensed signals (R1, R2, R3). At least one first representation (242) of the set of representations (24) comprises representing signals of a subset (R1), which in particular comprises signals that vary in time, in an observation time window (K) via a map, in which one of the dimensions represented is time, and producing a corresponding first digital image (Rhf) of said set of digital images (Rhf, RIf, Rcf). The method comprises producing at least one composite image (Rf) via adding (248) to, in particular superimposition on, said first digital image (Rhf) one or more digital images (Rhf, Rcf, RIf) produced by signals of other subsets, and applying to said at least one composite image (Rf) said classification operation (26) to obtain at least one classification signal (Q) indicative of a state of said industrial process as a result of said classification operation (26).

16 Claims, 8 Drawing Sheets

(52) U.S. Cl.
    CPC ............... *G05B 2219/31449* (2013.01); *G06T 2207/20056* (2013.01); *G06T 2207/20064* (2013.01); *G06T 2207/20081* (2013.01); *G06T 2207/20084* (2013.01)

(56) References Cited

U.S. PATENT DOCUMENTS

| | | | |
|---|---|---|---|
| 9,056,368 | B2 * | 6/2015 | Stork Genannt Wersborg ............ B23K 26/02 |
| 11,651,484 | B2 * | 5/2023 | Luedi ................... B23K 31/125 382/141 |
| 12,013,670 | B2 * | 6/2024 | Schwarz .............. B23K 31/006 |
| 2020/0212676 | A1 | 7/2020 | Dehghanian et al. |
| 2022/0157050 | A1 * | 5/2022 | Okushiro ................. G06T 5/50 |
| 2022/0324092 | A1 * | 10/2022 | Schaer ................... B23Q 17/10 |
| 2023/0195073 | A1 * | 6/2023 | Sagasaki ............. G05B 19/402 700/186 |

OTHER PUBLICATIONS

Zhang, Kai, et al. "Data augmentation for motor imagery signal classification based on a hybrid neural network." Sensors 20.16 (2020). 4485. (Year: 2020).*
International Search Report and Written Opinion of the ISA for PCT/IB2021/061751, mailed Apr. 4, 2022, 18 pages.
Shevchik et al., "Supervised deep learning for real-time quality monitoring of laser welding with X-ray radiographic quidance", Scientific reports, Feb. 25, 2020, pp. 3389-3389, XP055832669.
Verstraete et al., "Deep Learning Enabled Fault Diagnosis Using Time-Frequency Image Analysis of Rolling Element Bearings", Shock and Vibration vol. 2017, Jan. 1, 2017, pp. 1-17. XP055832066.
Zhang et al., "Data Augmentation for Motor Imagery Signal Classification Based on a Hybrid Neural Network", Sensors, vol. 20, No. 16 Jun. 26, 2020, pp. 1-20, XP055832068.

* cited by examiner

STFT / CWT t t

METHOD OF MONITORING INDUSTRIAL PROCESSING PROCESSES, CORRESPONDING APPARATUS AND COMPUTER PROGRAM PRODUCT

This application is the U.S. national phase of International Application No. PCT/IB2021/061751 filed Dec. 15, 2021, which designated the U.S. and claims priority to IT patent application No. 102020000031100 filed Dec. 16, 2020, the entire contents of each of which are hereby incorporated by reference.

TECHNICAL FIELD

The present description relates to techniques of monitoring the state of industrial processing processes carried out by processing machines, in particular laser processing machines, namely industrial processes carried out using laser, such as laser cutting.

One or more embodiments may be applied, for example, in contexts of quality control of laser processing.

TECHNOLOGICAL BACKGROUND

Processes of processing objects that use laser beams comprise guiding and focusing on the object being machined a laser beam emitted by a respective laser source. Processing may include, for example, laser cutting or laser welding. Laser processing machines provided for carrying out the aforesaid machining may comprise, for example, machine-tool devices, such as laser processing heads.

It is deemed relevant to monitor the welding process continuously during the entire laser processing process so as to guarantee the quality of machining, for example welding.

At the same time, laser processing processes (e.g., laser cutting) are complex processes, of which it is difficult to provide an adequate description in closed form that allows to describe analytically the evolution and quality thereof starting from the information available on the machine.

Among the conventional solutions the following documents may, for example, be mentioned:

EP 1464435 A1 that discusses a method for controlling the quality of an industrial laser process, in which quality is evaluated on the basis of signals emitted by means for detecting the radiation emitted by the treatment area, without the need for a comparison with predefined reference signals indicating a good quality process;

WO 2020/104103 A1 that discusses a system for monitoring a laser machining process for machining a workpiece, comprising: a computing unit which is designed to determine an input tensor on the basis of current data of the laser machining process and to determine an output tensor on the basis of the input tensor using a transmission function, said output tensor containing information on a current machining result, wherein the transmission function between the input tensor and the output tensor is formed by a trained neural network;

WO 2020/104102 A1 that discusses a system for detecting machining errors for a laser machining system for machining a workpiece, the system comprising: a detection unit for detecting image data and height data of a machined workpiece surface; and a computing unit, wherein the computing unit is designed to generate an input tensor based on the detected image data and height data and to determine an output tensor on the basis of the input tensor using a transfer function, said output tensor containing information on a machining error.

Notwithstanding the vast activity in the above field, as witnessed, for example, by the various documents listed previously, further improved solutions are desirable.

OBJECT AND SUMMARY

An object of one or more embodiments is to contribute to providing such an improved solution.

According to one or more embodiments, the above object can be achieved by means of a monitoring method having the characteristics set forth in the annexed claims.

One or more embodiments may relate to a corresponding apparatus for industrial processes. A laser cutting processing machine may be exemplary of such an apparatus.

One or more embodiments may relate to a corresponding computer program product loadable into the memory of at least one processing circuit (e.g., a computer) and including software code portions for executing the steps of the method when the product is run on at least one processing circuit. As used herein, reference to such a computer program product is understood as being equivalent to reference to a computer-readable medium containing instructions for controlling the processing system in order to co-ordinate implementation of the method according to one or more embodiments. Reference to "at least one computer" is intended to highlight the possibility of one or more embodiments being implemented in modular and/or distributed form.

The claims form an integral part of the technical teaching provided herein with reference to the embodiments.

Various embodiments present the advantage of exploiting a data-driven empirical approach based upon a parametric model, where the structure of the functional links between input and output can be uncoupled from the structure that the constitutive equations of the system or process would have.

One or more embodiments may use an artificial-neural-network processing in which the parameters are determined through a training procedure on a database at input and accordingly at output so as to pursue minimization of a loss function.

One or more embodiments may use techniques of deep learning (DL) that, by making significant transformations on the data through filtering of a series of layers, are able to "learn" useful representations of the available data themselves.

One or more embodiments may use at least one deep neural network (DNN) as a sort of multi-stage operation of "distillation" of the information, in which the latter proceeds through a series of successive filters, coming out thereof increasingly "purified", namely targeted for a certain application.

One or more embodiments may use image recognition methods via convolutional neural networks (CNNs).

In one or more embodiments, the "raw" data of the machine may be used to produce and analyze images to be supplied to subsequent user stages.

In one or more embodiments, the method makes it possible to intervene in a short time to identify, from the data, any possible malfunctioning of the machine.

BRIEF DESCRIPTION OF VARIOUS VIEWS OF THE DRAWINGS

One or more embodiments will now be described purely by way of example, with reference to the annexed drawings, wherein.

Figure 4A:
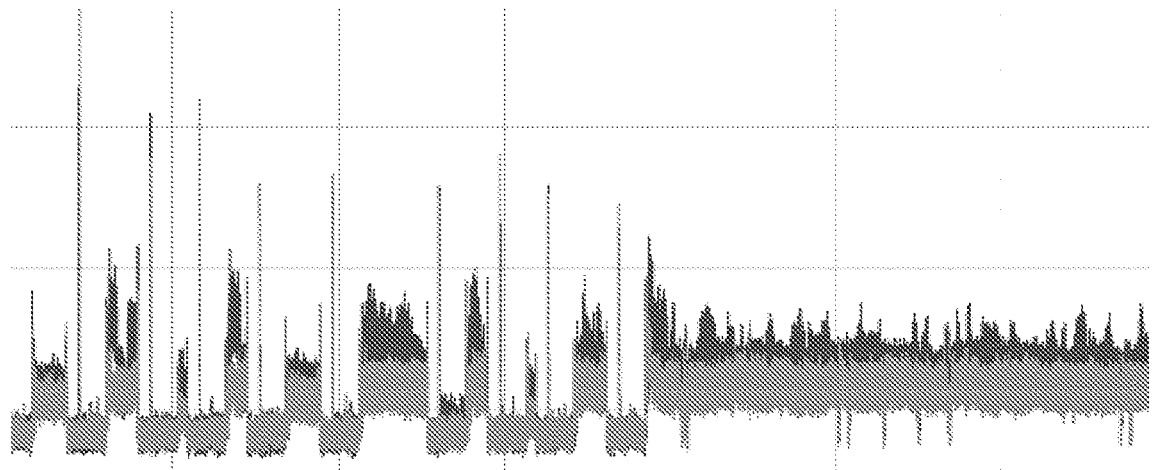
Figure 4B:
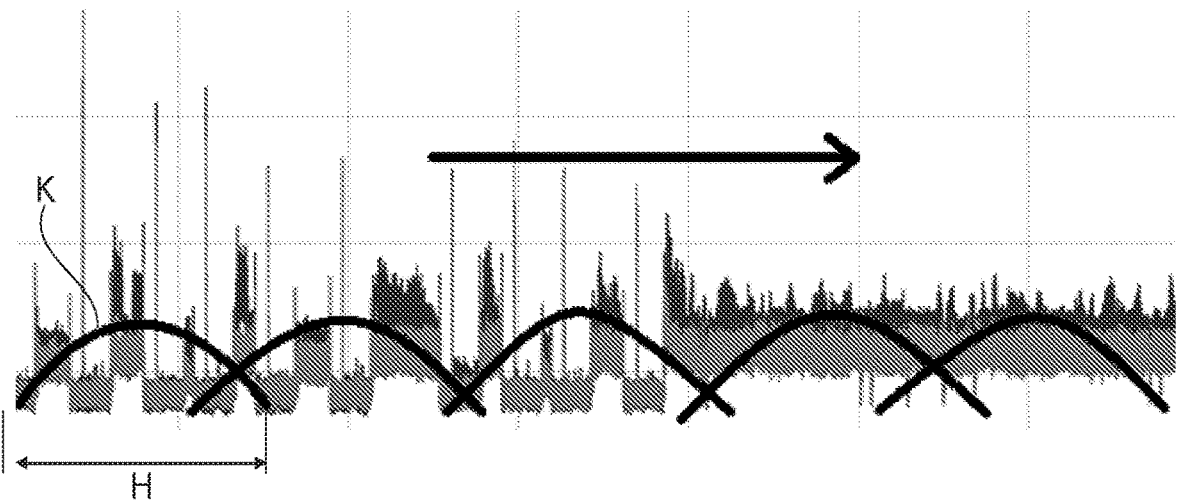
Figures 4C, 4D:
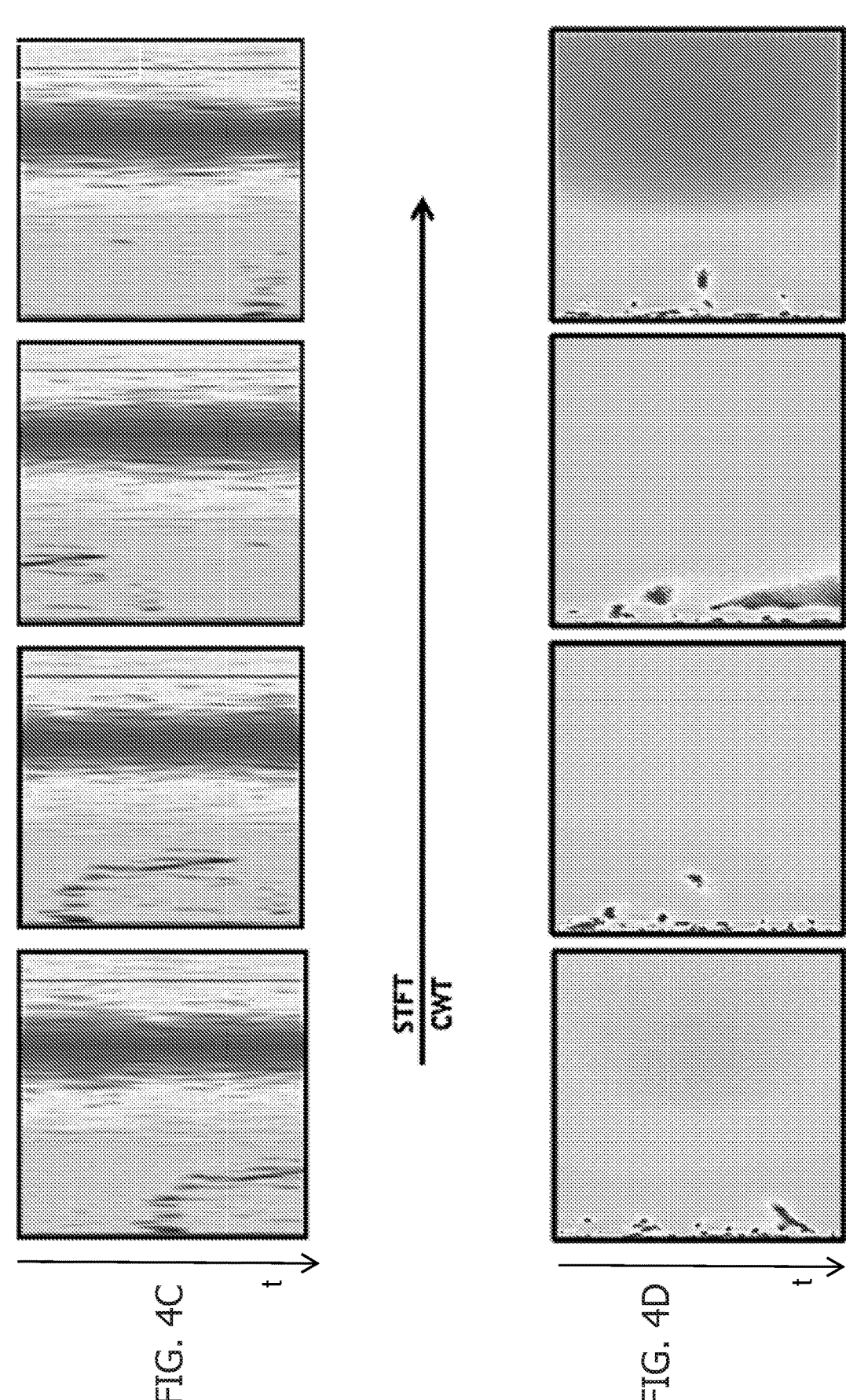
Figures 4E, 5:
Figures 6, 7:
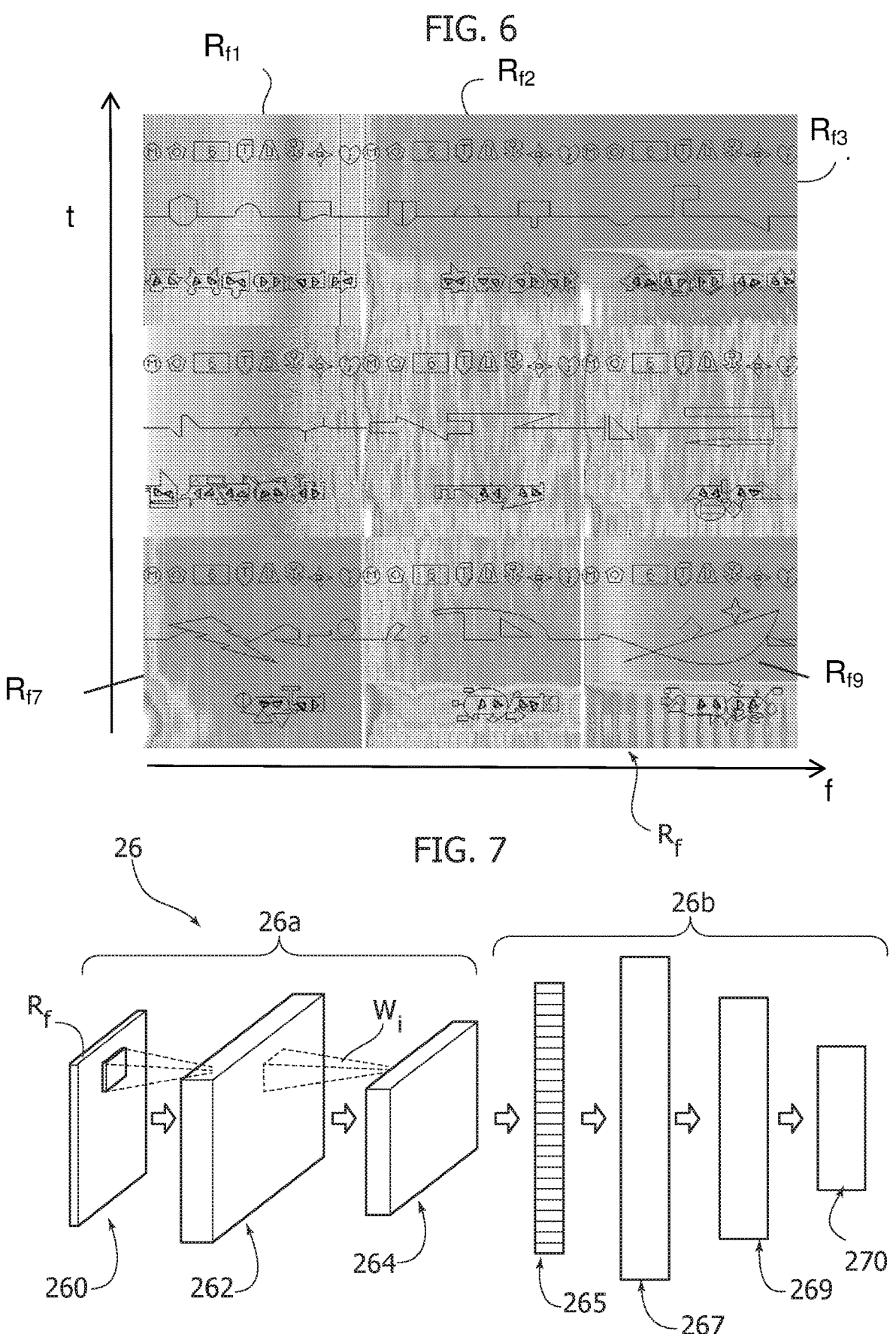
Figure 8:
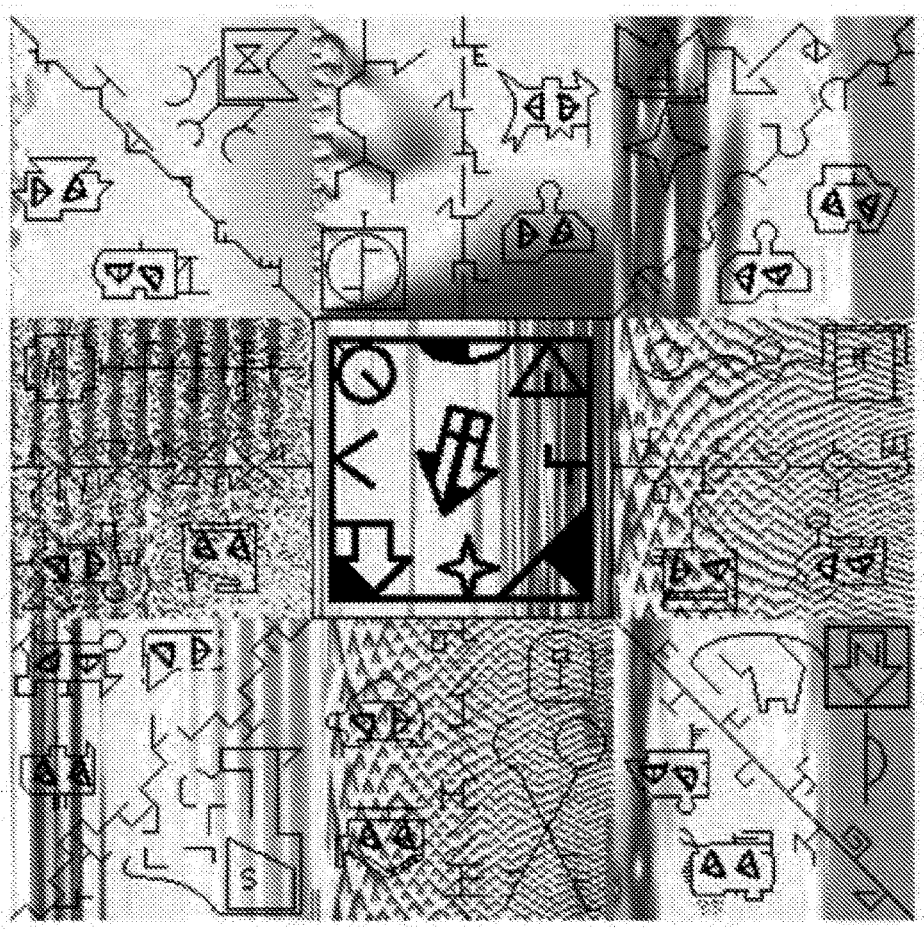
Figure 9:
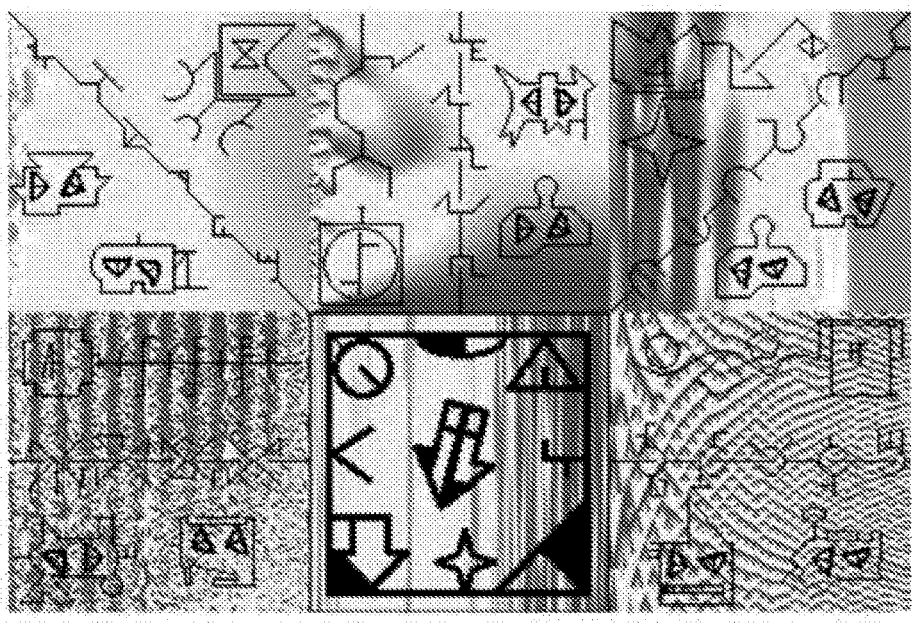

FIGS. 4A, 4B, 4C, 4D, and 4E exemplify principles underlying one or more embodiments;

FIG. 5 exemplifies a portion of FIG. 6;

FIG. 6 exemplifies a set of signals transformed according to the method discussed herein;

FIG. 7 is a diagram exemplifying an artificial-neural-network processing technique; and FIGS. 8 and 9 exemplify sets of alternative embodiments of FIG. 6.

DETAILED DESCRIPTION OF EXAMPLES OF EMBODIMENTS

In the ensuing description, one or more specific details are illustrated, in order to enable an in-depth understanding of examples of embodiments of the present description. The embodiments may be obtained without one or more of the specific details or with other methods, components, materials, etc. In other cases, known operations, materials, or structures are not illustrated or described in detail so that certain aspects of the embodiments will not be obscured.

Reference to "an embodiment" or "one embodiment" in the framework of the present description is intended to indicate that a particular configuration, structure, or characteristic described with reference to the embodiment is comprised in at least one embodiment. Hence, phrases such as "in an embodiment" or "in one embodiment" that may be present in one or more points of the present description do not necessarily refer precisely to one and the same embodiment.

Moreover, particular conformations, structures, or characteristics may be combined in any adequate way in one or more embodiments.

The references used herein are provided simply for convenience and hence do not define the sphere of protection or the scope of the embodiments.

As used herein, the term "image" refers to a digital image, namely to the numeric representation of a two-dimensional image, in particular a bitmap representation whereby the image comprises a matrix of dots, referred to as pixels, the colour of which (in scales of grey or other colours) is encoded via one or more numeric values, denoted as bits.

Figure 1:
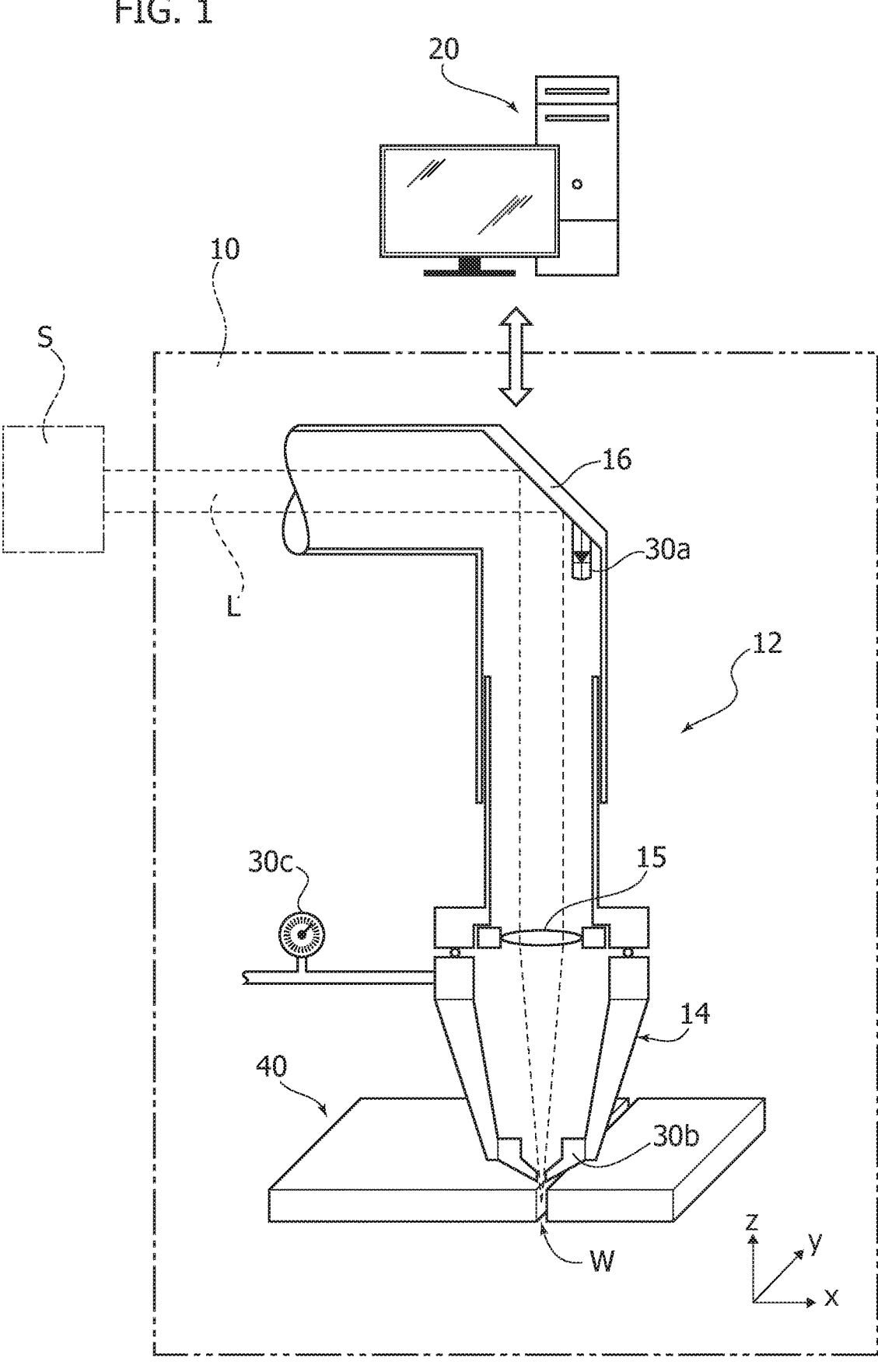
FIG. 1 is a diagram exemplifying an apparatus that implements the method according to the invention.
Figure 3:
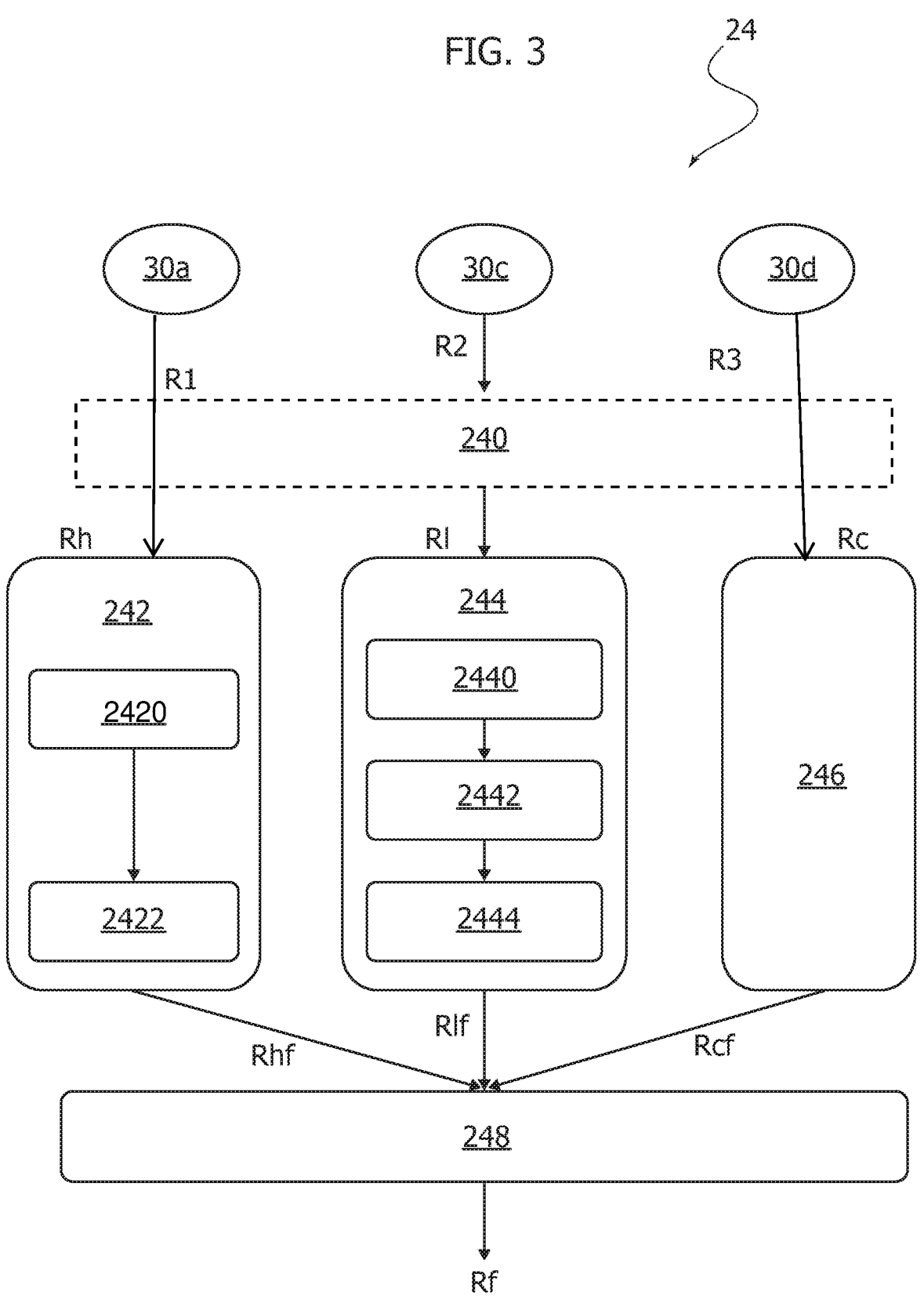
FIG. 3 is a flowchart of a method according to the invention.

FIG. 1 is a schematic illustration of an example of apparatus or system for carrying out laser machining 10, for example a laser processing machine, such as to implement a quality-control method as described herein, in particular with reference to FIGS. 3 and 4.

For instance, such an apparatus 10 may comprise:

a mobile structure 12, which is able to move (e.g., via actuators) according to axes (e.g., the cartesian axes X, Y and Z) and comprises a laser end effector or laser head 14 configured to guide a laser beam L from a laser source S to a work region or envelope 40 to carry out laser processing therein, for example to carry out laser cutting W on a lamina, sheet, or plate of metal material;

a set of sensors 30a, 30b, 30c coupled to the mobile structure 12, and comprising one or more sensors configured to sense and provide measurement signals or data R of parameters related to the laser processing process, in ways per se known; and a processing module 20, such as a computer, coupled to the apparatus 10 and configured to communicate therewith, for example transmitting movement-driving commands to the mobile structure 12 and receiving the measurement data R sensed by the set of sensors 30a, 30b.

As illustrated in FIG. 1, the laser end effector 14 in the mobile structure 12 may comprise a lens 15 which is reached by the laser beam L directed thereto by a mirror 16, which may in turn be orientable.

In what follows, reference will be made, for the sake of simplicity, to an apparatus 100 comprising a processing machine 10 with a mobile structure 12 of a cantilever type with three cartesian axes (denoted by the letters X, Y, Z), also referred to as cartesian machine. It is noted that the type of structure discussed is in no way binding or limiting; in fact, the solution discussed can be adapted to structures of other types, e.g., with six degrees of freedom (redundant axes ones), or ones that follow only two-dimensional trajectories.

Once again for the sake of simplicity, in what follows, reference will be made mainly to a laser end effector 14 configured to carry out cutting operations W, being otherwise understood that such a type of laser processing is provided purely by way of non-limiting example. In various embodiments and variants, the apparatus 10 can use one or more end effectors configured to carry out (virtually) any type of laser processing or in general also other types of processing for industrial processing processes.

As mentioned, the sensors of the set of sensors 30a, 30b, 30c are configured to sense values of process parameters, for example quantities and other parameters of the processing process that is carried out by the laser processing apparatus 10, that is to sense measurements of quantities indicative of operation of one or more parts of the apparatus 10 itself. The sensors of the set of sensors 30a, 30b, 30c are likewise configured to generate respective measurement signals or data R that indicate the values of the quantities measured and to transmit these signals R to the processing module 20.

As exemplified in FIG. 1, sensors of the set of sensors 30a, 30b, 30c may comprise:

a process sensor 30a, such as a photodiode, which faces the inside of the end effector, in the channel to guide the laser beam L so as to sense the radiation transmitted to or reflected from the work region 40;

a proximity sensor 30b coupled to a distal end (or tip) of the end effector 14 from which the laser beam L exits directed towards the work region 40; and a pressure (and/or temperature) sensor 30c coupled to a distal portion of the end effector 14 from which the laser radiation L exits, for example via a channel that guides an inert gas from a tank (not illustrated in FIG. 1) towards the inside of the distal portion of the end effector 14.

It is noted that such a composition of sensors of the set of sensors 30a, 30b, 30c is provided purely by way of non-limiting example. In one or more embodiments, the set of sensors 30a, 30b, 30c may comprise, in addition or as an alternative, at least one sensor of a type of sensor taken among known types of sensors, such as those of an inertial type (e.g., a triaxial accelerometer, a gyroscope, etc.), a temperature sensor coupled to the tip of the end effector 14, and a laser power sensor.

The sensors belonging to the set of sensors 30 preferably provide at output one-dimensional signals, in particular ones representing raw data, namely sensed but not processed. As discussed in what follows, said one-dimensional signals are preferably then transformed into two-dimensional signals in two-dimensional maps in which one dimension is time, for example a time-frequency map or a time-scale map.

However, it is also possible to make use of sensors that directly provide at output two-dimensional signals. For instance, the sensor (photodiode) 30a could be replaced or accompanied by a spectrometer, or mini-spectrometer, which senses the radiation emitted by the process and directly supplies at output a two-dimensional time-frequency signal. In this case, no processing is necessary for the two-dimensional representation.

The above signals, whether one-dimensional or two-dimensional, supplied by the sensors 30 comprise signals that vary in time.

For the sake of simplicity, in what follows the term sensor 30 is used in the singular, being otherwise understood that what is described for the sensor 30 may be extended, for example, to any type of sensor, to more than one sensor, and to each sensor in the set of sensors.

The sensor 30 may likewise comprise those of a "soft" or virtual type, comprising sensors or sensor sets that measure other quantities and that, via processing, obtain the estimate of a quantity representative of the process. For instance, the proximity sensor 30b, where in particular "proximity" is referred with respect to the metal sheet, for example a capacitive sensor, also referred to as "gap sensor", can be used to measure electronically a count frequency, while the software processing that is carried out on board a CNC control unit 22, described more fully hereinafter, makes it possible to derive from the above frequency the distance between the tip of the laser head 14 and the surface of the metal sheet in the work region 40.

The operation of sensing also comprises acquisition of process parameters, for example parameters linked to the state of machine configuration 10 to carry out a certain processing, such as the type of material and thickness of the material being machined, the type of process gas, the type of end effector and lens, the type of laser, the type of machine, etc. These parameters can be "sensed", for example, by accessing locations of a memory of the processing module 20 in which the respective values are stored.

The signals and parameters acquired may be temporally divided according to time intervals referred to as "zones of interest". For instance, the zone of interest may correspond to a specific interval during processing; for example, from when the machine 10 starts to cut, signals are acquired for a finite time interval (e.g., 1 second). The zone of interest may also correspond to a sensing kept active throughout the duration of cutting, in real time. Segmentation of the data regarding the signals and/or parameters acquired allows intervening in the shortest time possible by identifying from the data any possible malfunctioning of the machine.

Furthermore, for example it is possible to sense simultaneously different values via one or more different types of sensors.

The processing module 20, as mentioned, is hence configured to be coupled to the apparatus 10, in particular to the sensor 30 and to the motors of the mobile structure 12 in order to drive movement of the end effector 14 with respect to the work region 40 so as to carry out a movement according to the axes X, Y, Z.

It is noted that for the sake of simplicity in what follows the expression "movement of axes X, Y, Z" will be understood as referring to the operation of driving the motors and/or actuators coupled to the mobile structure 12 so as to move the end effector according to the aforesaid one or more axes X, Y, Z.

As mentioned, once the sensor 30 transmits the measurement data R to the processing module 20, the module 20 can be configured to process the measurement data R, for example so as to:
carry out operations of a quality-control method 1000 on the state of laser processing, as discussed in what follows with reference to FIG. 3; and/or
execute movement of the axes X, Y, Z, for example by carrying out feedback on the apparatus 10.
As exemplified in FIG. 2, the processing module 20 comprises:
an interface unit 21, configured to receive readings R from the sensor 30 and/or transmit to the apparatus 10 instructions (e.g., a work program P), for example supplied by an external operator or by other stages connected thereto;
a control unit 22, referred to as CNC (Computer Numerical Control), configured to receive/transmit (in brief, transceive) instructions P from/to the interface 21 and operatively connected to the motors and/or actuators to translate the instructions into the movement of the axes X, Y, Z, for example by driving the motors and/or actuators in the mobile structure 12 of the machine 10 to displace the end effector 14 following a path in the reference apparatus X, Y, Z;
a data-representation stage 24 configured to receive the reading signals R of the sensor 30 from the interface 21 and applying to them at least one data-transformation processing, consequently obtaining (at least) a composite image Rf, as discussed in what follows; and
a pattern-recognition stage 26, in the example a classification stage, configured to receive the composite image Rf and to apply thereto an image pattern-recognition processing, for example an artificial-neural-network processing, in particular of a convolutional-neural-network (CNN) type, to obtain a recognition signal Q to be supplied to a user circuit, such as the interface unit 21; in particular, the recognition signal Q is a classification signal and may indicate a level of quality of the laser processing that the apparatus 10 has carried out or is carrying out.
In the present description, "pattern recognition" is meant as automatic recognition of patterns and regularities in data, in particular the data supplied at input to the stage 26. Even though in the present description reference is made to pattern recognition obtained via neural networks, application of the solution described may also include pattern recognition via rule-based systems, classic fuzzy systems, Bayesian systems, fuzzy neural-network systems. Reference is moreover made herein to a pattern recognition that envisages a training phase in which a training dataset is used to train the recognition model, prior to a recognition phase via the trained model, implemented during processing, also referred to in what follows as "inference phase", in particular with reference to the use of pattern recognition via neural networks.

For instance, the CNC unit 22 in the processing module 20, comprises (represented as dashed boxes within the stage 22) a first processor 222 and a second processor 224, as well as a servo-drive module or card 226, namely a card comprising one or more servo-drives, servo-amplifiers, or servo-control modules for the motors/actuators of the machine 10.

Figure 2:
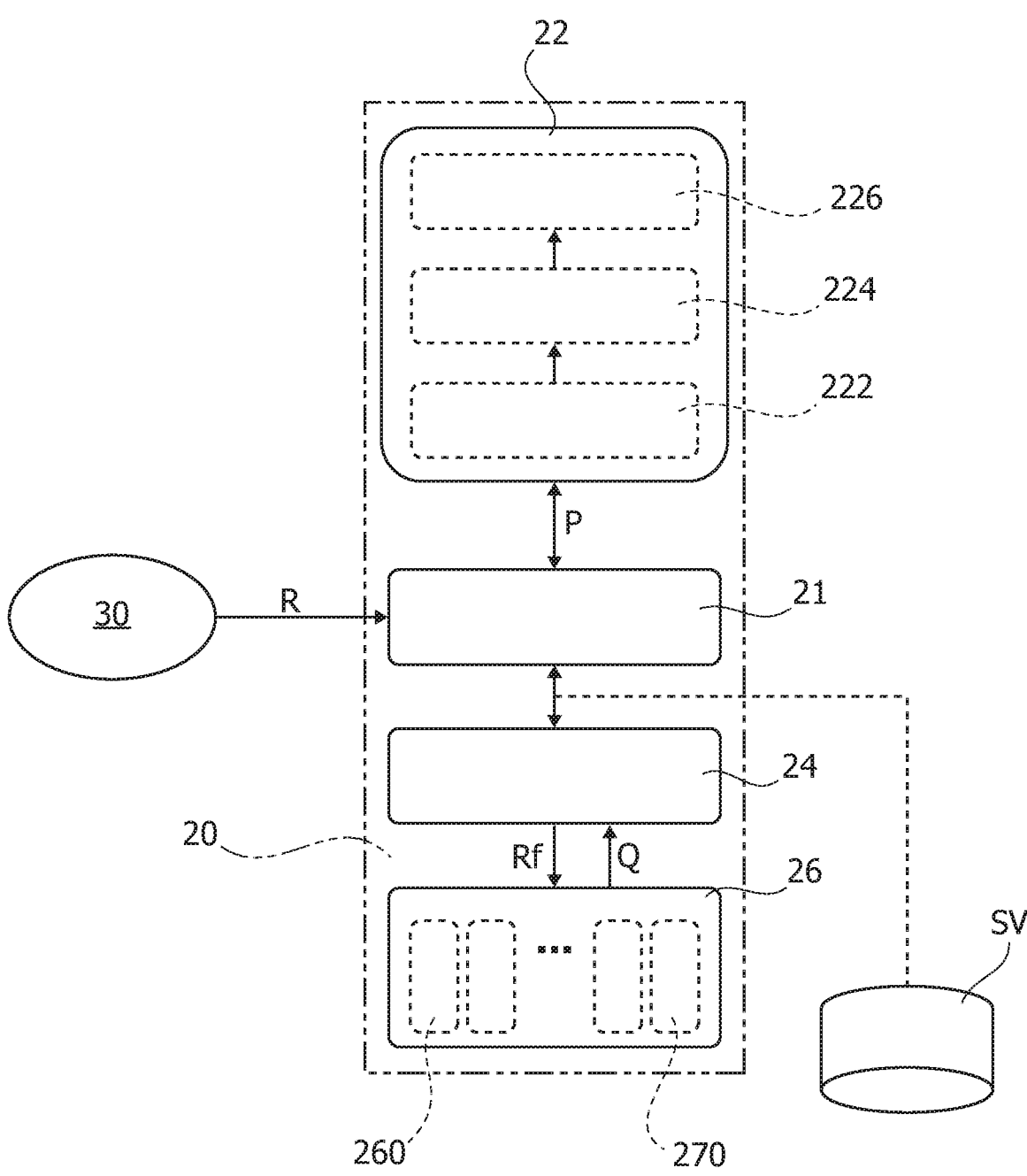
FIG. 2 is a diagram regarding a portion of FIG. 1.

As exemplified in FIG. 2, the first processor 222 may, for example, operate as user interface to send instructions P and commands to the second personal computer 224, which, for example, comprises an operating system of a Linux type associated to extensions of a real-time type for management of the machine 10. Consequently, the second processor 224 supplies to the servo-drive card 226 (e.g., of a DSP CPCI type to control one or more actuators or motors) at least one movement trajectory. Implemented in the second processor 224 and in the servo-drive card 226 are procedures to manage the mobile structure 12 in order to displace the end effector 14 with respect to the region 40, in particular with respect to its surface, so as to carry out processing W. Naturally, other architectures are possible for the CNC unit 22 and in general to perform control of the machine 10.

As mentioned, the CNC unit 22 in the processing module 20 controls operation of motors and actuators for moving the axes X, Y, Z of the mobile structure 12, according to programs, or sequences of programming instructions P, pre-set as a function of the requirements of processing of the piece, and in a co-ordinated way. Such programs P are prearranged for moving the mobile structure 12 so as to displace the end effector 14 with respect to the envelope 40 illustrated in FIG. 1. The CNC unit 22, for example according to procedures in per se known in the prior art, generates/applies a sequence of programming instructions P corresponding to a so-called part program for a virtual machine with given specifications of acceleration and speed. This sequence of programming instructions P, if it is not provided by an external user, comes from the first processor 222 and is originated by a purposely designed program to set the movement of the axes X, Y, Z of the mobile structure 12. Applied thereto is an interpolation function that, based on the sequence of instructions P, generates the trajectory of the end effector 14. This interpolation operates in response to preparation codes, or G-Codes, sent within the sequence of programming instructions P. The interpolation operation is implemented via software within the second processor 2004.

As represented in FIG. 2, the interface unit 21 in the processing module 20 may comprise an input/output device, for example a display with touch-screen of a video terminal for an operator, with which a user, for example, can modify instructions or parameters of instructions of the part program representing the sequence of programming instructions P. In addition or as an alternative, the interface unit 21 can display messages regarding the processing quality based on one or more signals Q supplied by the artificial-neural-network processing 206.

As exemplified in FIG. 2, the representation stage 24 in the processing module 20 may be configured to operate as pre-processing stage of the data (the reading data R of the sensor 30 or other data on the state of the machine 10) exchanged between the interface unit 21 and the pattern-recognition stage 26 to which the representation stage 24 can apply a preliminary operation of data transformation, for example from the one-dimensional time domain to a multidimensional domain, as discussed, for example, with reference to FIG. 3.

The pattern-recognition stage 26 in the processing module 20 may comprise a set of layers of artificial-neural-network processing 260, 270.

The pattern-recognition stage 26 may be configured to provide one or more recognition signals Q as classification signals of the processing in progress or carried out according to the categories regarding the "state" or "quality" of the aforesaid processing. To these classification signals there may be associated a set of information (e.g., in the form of a text report or a text string) that may regard an evaluation of a level of processing quality or an operation to be carried out based on such an evaluation (such as rejecting the processing if it is deemed of poor quality). Once obtained, the information associated to the classification signal Q may then be supplied to user devices for different applications, which can carry out pure reporting of the information, locally and possibly remotely, or also carry out automatic checks or activate processing feedback based on this information and possibly in order to correct the process.

The set of information in the recognition signal Q, processed by the pattern-recognition stage 26, may hence comprise a classification of the signal (e.g., an ok/not-ok binary classification) in a series of categories comprising, for example: cutting quality, report on percentage cutting with localization, cutting profile. In another example, the information may report a possible wrong loading of the metal sheet to be machined into the apparatus 10.

The above set of information, specifically the aforesaid processing classification, in the recognition signal Q supplied by the pattern-recognition stage 26, may then be supplied, for example, to one or more of the following:
    the interface unit 21 of the processing module 20, for example configured to communicate it to an operator via display of a text message,
    a server SV, for example an Internet cloud server, and
    an internal network, for example a service LAN.

The server SV can communicate with all the stages in the processing module 20 to facilitate downloading of updates of software implementation of operations of the method, such as new versions of the software of the neural-network processing stage 26. Likewise, the neural-network processing stage 26 can send, for example via the representation stage 24 or the interface unit 21 (or directly), data gathered in field to be added to a remote database on the server SV containing data to be used to train the networks themselves, in order to render subsequent data-processing operations more robust or to facilitate analysis of new quality-control profiles.

The processing module 20 can thus be configured to exchange instructions and data P, R, Rf, W, at input and output, with users, for example, Internet networks, with communication modalities in per se known, as explained in greater detail in what follows.

For the sake of simplicity, principles underlying one or more embodiments are discussed in what follows mainly with reference to the exemplary case in which the processing is applied to a set of measurement signals R comprising:
    a first measurement signal R1 sensed by the process sensor 30a, for example a photodiode signal;
    a second measurement signal R2 sensed by the temperature sensor 30c coupled to the tip of the end effector 14; and
    a third set of signals R3 of machine parameters sensed by a sensor 30d, understood as device, for example a computer, which, for example, acquires information on the parameter from a memory location.

It is otherwise understood that the foregoing discussion is provided purely by way of non-limiting example insofar as the aforesaid representation of data 24 may extend to any number and type of measurement signals coming from other types of sensor (position error from the encoder, distance of metal sheet from the proximity sensor, etc.).

Represented via a flowchart in FIG. 3 is a data-representation operation that can be carried out by the data-representation stage 24 configured to carry out a data-representation operation. This data-representation operation comprises:
    a data-sorting operation 240, which comprises receiving the measurement signals R1, R2, R3 of the set of signals R from respective sensors 30a, 30c, 30d of the set of sensors 30, and sorting them into one of the representation operations 242, 244, 246 based on a criterion of distinction that preferably distinguishes them according to a rapidity (or rate) of variation of the signal in a signal-observation time window, hereinafter denoted by K. In FIG. 3, the data-sorting operation 240 comprises a labelling, namely a logic recognition operation, in the example described an operation of classification, to enable then routing of the signals R to the respective representation operations, namely to label the aforesaid received signals R1, R2, R3 based on a criterion of distinction, thus obtaining labelled measurement signals RI, Rh, Rc, and then sorting the respective labelled measurement signals RI, Rh, Rc into one of the representation operations 242, 244, 246 selected based on the label assigned; as in such an example, such a selection may be based upon criteria of distinction based on the rapidity of temporal variation of the signal in the observation window—namely high/low/constant dynamics, that is, signals that contain prevalently high frequencies/low or lower frequencies/substantially zero frequency, respectively—of each signal R1, R2, R3 of the set of signals R. As also mentioned hereinafter, the measurement signals R1, R2, R3 are not necessarily received directly from the sensors in the data-sorting stage 240, but may, at output from the sensors, be subjected to data processing, such as filtering operations. The data-sorting operation 240 hence carries out sorting based on the distinction criteria on the signals R1, R2, R3 as received in the stage 240. This operation can be carried out in the stage 24 based on a simple pre-set correspondence; namely it is pre-established that the signal R1 is to be represented according to the operation 242, the signal R2 according to the operation 244, and the signal R3 according to the operation 246. Hence, more in general, the operation 240 corresponds to assigning signals among the sensed signals R1, R2, R3 to respective subsets, which correspond to the labels RI, Rh, Rc, of the above set of sensed signals R; namely in the set of sensed signals R, subsets RI, Rh, Rc are defined corresponding to which are respective representations 242, 244, 246 of the signals assigned to the subset. This definition of subsets RI, Rh, Rc may be, for example, based on the distinction criteria, or else also in an arbitrary way and/or via manual assignment of the signals to the subsets. A criterion of distinction, for example according to the dynamics, may be evaluated beforehand by studying the signals of the sensors.

It is clear that in a simple embodiment it is possible to start from a first signal R1 that is deemed to represent the state of the process and that has a given rate of variation in time, assign it to the representation 242, and then assign the other signals of the other sensors available to the representation 244, if they present a slower variation or are rendered slower, for example via filtering, and to the representation 246, if they are constant in the observation window. The operation 240 may also be implemented via a module in the stage 24 that evaluates the distinction criteria during operation. In general, the data-sorting operation 240 represents the above assignment to subsets, or in any case routing of the signals of the sensors towards the corresponding representation operations according to a criterion of distinction (or classification) and may be considered optional or implicit if the signals of the sensors are sent on to the respective representations in a predefined way. This distinction preferably takes into account the rapidity of variation of the signal, but in general envisages selection of a first signal, R1, for the operation 242 that is considered apt to provide a signal indicative of the state of said industrial process as a result of said pattern-recognition operation 26, in particular with neural-network processing, in the example a classification operation via neural network. The first signal R1 will in itself have a rapidity of variation of its own, the signals sorted into the operations 244 and 246 have a rapidity of variation slower than the signal R1 (or rendered slower, for example via filtering) or are even constant in the observation time window (e.g., state parameters), a first operation of representation 242 of high-dynamic signals, the first representation operation 242 comprising receiving from the sorting stage 240 a set of signals labelled as high-dynamic signals Rh, namely signals the variations of which within the observation window are more rapid, and representing them graphically via a map, in which one of the dimensions represented is time, in particular a diagrammatic representation comprising two cartesian axes indicating two quantities, one of which is time, a third quantity, for example the amplitude of the values in the high-dynamic signals, being represented in the map via a graphic property associated to the points identified by the aforesaid two quantities, for example, colour or shade of grey, namely in particular applying to them, for example, a transformation from high-dynamic signals, which are in particular one-dimensional, to a representation that can be displayed as a two-dimensional image, obtaining as a result a first digital image Rhf;

a second operation of representation 244 of low-dynamic signals, the second representation operation 244 comprising receiving from the sorting stage 240 a set of signals labelled as low-dynamic signals RI, namely signals whose variations within the observation window are slower than those of the signals labelled as high-dynamic signals Rh, and representing them graphically as an image by extracting a representative value over a time interval coinciding with the time interval of representation of the first signal R1 or comprised therein, obtaining as a result a second digital image RIf. It is pointed out how a signal labelled as low-dynamic signal may be obtained, from a sensor that in itself supplies at output a signal with higher dynamic, via filtering, for example low-pass filtering, or sub-sampling, or via other operations that render it a signal with lower dynamic;

a third operation of representation 246 of constant-dynamic signals, the third representation operation 246 comprising receiving from the sorting stage 240 a set of signals labelled as constant-dynamic signals Rc, namely signals whose value or indication is constant or does not present appreciable variations within the observation window, for example parameters indicative of the state of the machine, and representing them graphically as image by extracting a representative value over a time interval equal to or shorter than the time interval of representation of the first signal R1, which usually corresponds to the above constant value or indication, obtaining as a result a third digital image Rcf; and an image-enrichment operation 248, which comprises receiving the first digital image Rhf, the second digital image RIf, and the third digital image Rcf, and producing, for example by superimposing the received images on one another, a composite image Rf.

For instance, in the exemplified case under examination, the sorting operation 240 applied to the signals R1, R2, R3 may label:

the first signal R1 as high-dynamic signal and pass it on, as high-dynamic signal Rh, to the first processing stage 242;

the second signal R2 as low-dynamic signal and pass it on, as low-dynamic signal Rl, to the second processing stage 242; and the third signal R3 as constant-dynamic signal and pass it on, as constant-dynamic signal Rc, to the third processing stage 246.

As mentioned, "high-dynamic signals" and "low-dynamic signals" are meant as signals that vary more or less rapidly, in particular with respect to one another, in the observation window. As mentioned, high-dynamic signals are in general the process signals useful to be employed in the pattern-recognition stage 26. Hence, low-dynamic signals are signals that have a prevalent frequency content with lower frequency and possibly a limited bandwidth in the observation window.

By way of example, it may be known that the signal of the photosensor 30a is apt to providing information on the laser welding process, and so this signal is labelled so as to be routed to the operation 242. The signals to be labelled as R2 are selected as long as they present a slower variation in the interval, such that, for example, selection of the average value will represent the quantity measured in the observation window.

As discussed herein, the term "dynamic", whether low or high, refers to the signal in relation to the state equations that describe the dynamic system representing the sensor or measuring instrument that supplies the measurement signal. For instance, the dynamic response of such a dynamic system is a function of the eigenvalues of the respective state matrix, where the relative position of the aforesaid eigenvalues in the complex plane determines the bandwidth and spectral content of the measurement signal (within the cut-off frequency).

The Inventors have noted that signals with reduced bandwidth and spectral content distributed in a restricted neighbourhood around the zero-frequency DC component are tendentially not suitable for a representation of a time-frequency (or time-scale) map type, given that this representation would lead to a substantially uniform image and hence an image with low information content associated thereto, with consequent potential complexity of processing by the neural network.

Hence, given a signal R1 selected for a map representation where at least one dimension is time, for example a time-frequency map or a time-scale map, once the high-dynamic signal is defined, a low-dynamic signal, to be labelled as R2, has a spectral content prevalently at lower frequencies than said signal R1 and possibly a narrower bandwidth. In some embodiments, the frequency values associated to the prevalent spectral content, e.g., the band-centre frequency, of a high-dynamic signal differ by at least one order of magnitude from the frequency values associated to the spectral content of a low-dynamic signal. In variant embodiments, this difference is of a number of orders of magnitude. In general, the aforesaid energy content to define high and low dynamics is evaluated but for the DC component. For instance, a sensor 30, such as a photodiode that receives the radiation of a laser process, may have frequencies that range from the DC frequency to tens of kilohertz, for example 0-12.5 kHz, based on the sampling frequency applied, in the example 25 kHz, whereas a temperature-measuring signal may have a frequency of 0.1-1 Hz. The error on the pressure of the gas and the error on the stand-off, as likewise the trajectory acceleration itself or the errors of tracking of the trajectory axes, present an energy content that is, for example, prevalently concentrated in the range 0-30 Hz. In this case, the sampling frequencies are around 500 Hz.

The representation processing 24 may be divided into a number of stages, namely logic or hardware modules corresponding to the operations 240, 242, 244, 246, 248, being otherwise understood that such a representation is provided purely by way of non-limiting example. In some variant embodiments, moreover, operations discussed in relation to a certain stage could be carried out in another and/or the data of the sensors could be processed in a single stage 24 in the processing circuitry of the control unit 20.

As exemplified in FIG. 3, the first processing stage 242 may comprise applying an operation of transformation from the time domain to a multidimensional domain on the first signal Rh, namely applying the above transform so as to calculate transform coefficients with respect, for example, to a plurality of frequency values or scale values so as to carry out a transformation of the "raw" signal measured in time R1 into a corresponding "complex" signal, thus obtaining the first image Rhf of transformed data starting from the high-dynamic signals Rh, for example, as a multidimensional matrix that can be displayed as a two-dimensional image, in colour or in black and white.

Transform operations in per se known apt to being applied in block 242 comprise, for example in block 2422, at least one of the following:

a short-time Fourier transform (STFT) or time-shifted FFT, which yields a time-frequency map of the signal to which it is applied, namely information localized both in time and in frequency; and a continuous-wavelet transform (CWT), which provides a time-scale map of the signal to which it is applied, namely information localized both in time and in scale.

It is noted in this regard that it can be said that the CWT gives rise to a so-called scalogram, which gives the amplitudes as a function of time and scale; however, the scale can be brought back to a frequency via a simple further transformation. It may hence be said that more in general the solution described herein applies to representations in maps, the axes of which give the time and a quantity representative of a frequency: in the case of STFT, the frequency; in the case of CWT, the scale or a frequency value calculated based on the scale.

As mentioned, these transform operations, in block 2422, do not become necessary in the case of a high-dynamic signal Rh supplied at output from the sensor directly as two-dimensional signal, for example using a mini-spectrometer that intrinsically supplies at output a time-frequency map of the signal and hence an image Rhf, in which case the representation made in block 242 corresponds only to the graphic representation of the two-dimensional signal in the format of the digital image Rhf.

Applying, instead, the aforesaid representation operations, in particular transformation operations, in the first processing stage 242 may comprise, in block 2420, segmenting the signal on which these operations are applied into segments corresponding to observation windows, which may also coincide with zones of interest. These segments may be partially overlapping, for example segmented, via the use of a moving (observation) window K of width H.

FIG. 4A represents a possible time plot for the first signal R1 sensed in a time interval of interest (e.g., the entire duration of the cutting processing).

FIG. 4B is exemplary of how such a first signal R1 can be segmented 2420 via the use of the observation window K, for example of the Kaiser type or Hann type, or the mother wavelet itself, with a given width H, a given form factor, and a given margin of overlapping length between adjacent applications of the observation window K.

FIG. 4C shows possible representations of images of transformed high-dynamic signals Rhf as two-dimensional colour images representing time-frequency maps obtained by applying the transformation 2422 of an STFT type to the segments obtained from segmentation, as illustrated in FIG. 4B.

FIG. 4D shows possible representations of images of transformed high-dynamic signals Rhf as two-dimensional colour images representing time-scale maps obtained by applying the transformation 2422 of a CWT type to the segments obtained from segmentation, as illustrated in FIG. 4B.

Indicated in both of the images are the time axis t and the frequency axis f, whereas the colour intensity indicates the value or amplitude of the transform, STFT or CWT, respectively.

It is noted that the resolution of the STFT transform varies as a function of the predefined size, namely width H (see FIG. 4A), of the chosen observation window. In particular, the width H of the window K determines whether there is a good frequency resolution such that distinct frequency components close to one another may be separated, or a good time resolution understood in particular as the time at which the frequencies change. A wider observation window K provides a better frequency resolution but a worse time resolution; vice versa, a narrower observation window K gives rise to a better time resolution but a poorer frequency resolution.

In order to overcome this trade-off, the CWT (Continuous Wavelet Transform) can provide both good time resolutions for high-frequency events and good frequency resolutions for low-frequency events.

In particular, a CWT that uses a complex Morlet mother wavelet can favour attainment of satisfactory values in a joint way for both types of resolution.

In variant embodiments, the two transforms, STFT and CWT, can be used in a complementary way, for example applying the STFT in the cases where the computational complexity of the CWT risks of being excessively burdensome for the control unit 20.

It is noted that in one or more embodiments both types, SFTF and CWT, of data transformation processing can be used alternately, based on the fact that some signals could have a high sampling frequency and others a lower sampling frequency.

The size of the signal-observation time windows K may range from a few milliseconds for the CWT to some tens of milliseconds or a hundred milliseconds for the STFT.

For instance, in the case of the CWT, considering a time window of 128 samples and 128 scales, the width of the window is approximately 5 ms ($^{128}/_{25000}$ of a second), which is the time necessary to produce the 128×128 image of a single frame.

In the case of the STFT, the transform in itself is simpler, but the composition of the image is more complex. Aiming to generate once again a 128×128 image for a single frame, each line or row represents an FFT. Along the time axis 128 FFTs are computed, each of which undergoes a shift with respect to the previous one by a certain number of samples, for example eight. Each FFT should be computed on a number of points that is twice the number of points on the frequency axis (once again 128), hence: 128×2=256. For reasons of resolution, it is preferred to compute the FFT on a vector with a number of points that is a multiple of 256, for example according to a factor equal to 4 (hence on a 1024 vector) and then bring the dimension back to the original value via re-sizing of the transform. The resolution thus obtained is better than the one that would be obtained by applying the FFT on the 256-point vector. In the example considered, to generate, using the STFT, the 128×128 image of a frame, it is necessary for a number of samples to have elapsed equal to: (128−1)×8+4×(128×2)=2040 samples. This results in a length of time $^{2040}/_{25000}$ equal to approximately 80 ms. If a laser cutting operation is carried out at a rate for example of 30000 mm/min, in the case of the STFT, a distance of 147 mm would be covered before a frame is generated, whereas a distance of only 9 mm would be covered in the case of CWT.

The result of the calculation of time, performed for the signals sampled at 25 kHz, changes slightly in the case of signals sampled at 1 kHz, having considered performing a micro-interpolation of the quantities acquired at 1 kHz with a micro-interpolation factor of 25 so as to extract in any case samples every $^{1}/_{25000}$ s.

Linear interpolation has been discarded because it gives rise to spurious disturbance lines on the map of the image.

The interpolation adopted is the cubic one, which requires introduction of a delay of 4 samples, to evaluate the 4 coefficients of the interpolation curve.

The total time required to generate of a frame becomes:

$$(128/25 + 4)/10000 \text{ for the } CWT$$

$$\text{and } (2042/25 + 4)/10000 \text{ for the } STFT.$$

The processing block 2420, in the case provided by way of example of the two-dimensional signal produced by a mini-spectrometer, may comprise, instead of the segmentation and windowing operations, buffering and segmentation operations in order to render the width of the time dimension of the time-frequency map homogeneous with the width of the time dimension of the time-frequency/time-scale map constructed by the processing block 2422 starting from one-dimensional signals Rh.

As exemplified in FIG. 3, the second processing stage 244 may comprise the following operations:

segmenting (block 2440) the low-dynamic signal received RI into segments RIi corresponding to observation windows, by superimposing, for example on the signal RI, the moving observation (time) window having a predefined size, for example the same as that of the window used in the segmentation operation of block 2420 or an observation time window comprised in the aforesaid moving observation (time) window with predefined size;

computing a average value (block 2442) of each segment RIi obtained in block 2440;

applying a congruence modulo N operation (block 2444) to the calculated average value, where N is an integer equal to the maximum value of the dynamic range of the low-dynamic signals RI; and producing the second digital image RIf as image of markers or pointers to the value of the modulo obtained from application of the congruence modulo N operation, like the image of positions of clock hands of a virtual clock or of indicator knobs of a virtual counter, namely indicator elements, for example pointers that indicate a value of measurement on a graduated scale, preferably a circular graduated scale, as in the case of chronometer or tachometer, the counter in the example having a full scale that is equal to the value of the modulo N used and is located at a value of angle (even only slightly) below the turn angle.

Since the segmentation window to obtain segments RIi has a predefined size and is, for example, the same window as that used in the segmentation operation of block 2420 or an observation time window comprised therein, the representation as second image RIf refers to a time interval equal to or shorter than the time interval of representation of the first signal R1.

The second digital image RIf may be represented as an image comprising a sequence, corresponding to the sequence of the segments RIi, and hence to the corresponding different observation windows, of markers that "picture" a sequence of positions of the aforesaid knobs of the virtual counter, as shown, for example, in FIG. 5.

The Inventors have observed that such a differentiated processing allows transformation into multidimensional data of the temporal data to which it would otherwise be difficult to apply the transforms used for the high-dynamic signals with adequate resolution or dynamic range, given that these low-dynamic signals might carry a negligible frequency content.

Once again, the use of "virtual indicator knobs", e.g., clock hands, which indicate a value of measurement on a graduated scale, instead of simple strings to encode the information of the average value of the signal, means that numbers that are close to one another, for example, 19.9 and 20.1, maintain a certain degree of closeness if displayed as positions of a lap counter, namely one with a circular graduated scale with respect to which the indicator knob indicates values by turning around an axis of its own, whereas, if they were displayed as numeric values, a similar behaviour at the processing level would be associated to completely different image details so that conversely, based on the images, erroneous analyses of the processing quality would be obtained.

It is noted that use of the same observation window K both for the high-dynamic signals and for the low-dynamic signals allows to maintain a relation of association between the respective segments Rhi, RIi, so that the "slow" signals for the segments RIi will be associated to the "fast" signals for the segments Rhi of each acquisition (or acquisition window). In the example considered, the first fast signal R1 of a photodiode is associated to the second signal R2 indicating the gas temperature/pressure, whereas in another example a fast proximity-sensor signal (e.g., the stand-off of the capacitive sensor) is associated with the speed of the axes X, Y, and Z and the rate on the cutting profile, for example as average values, in the same observation window K.

In variant embodiments, the block 2444 may further comprise generating the digital image RIf by associating a frame of asymmetrical or irregular shape to each marker that indicates a position of the knobs on the virtual counter, as exemplified in FIG. 4E.

The purpose of the above frame is, for example, to facilitate subsequent pattern-recognition stages 26, in particular classification stages, in recognizing properly the position of the markers themselves.

As is known to persons skilled in the branch, neural networks, in particular those of a convolutional (CNN) type, may be configured to learn patterns that are invariant to translation.

The Inventors have observed that framing of the image of the markers RIf with a respective frame of an asymmetrical shape, in particular different from the other frames of the other markers RIf, in particular marker pairs in the example, regarding other quantities measured in the same observation window, can exploit the capability of the neural network to learn spatial pattern hierarchies.

In particular, the use of frames of an asymmetrical shape is aimed at facilitating unique identification of a given quantity to be processed, so that, in one and the same composite image, each frame-marker set for a given quantity will differ from the others; otherwise, the neural network could interpret multiple different positions as having the same meaning.

For instance, the second matrix of transformed data RIf may comprise a sequence of markers (framed by respective frames, which differ from one another) that virtually "picture" the positions of the setting knobs of the virtual counter regarding different quantities represented by low-dynamic signals RI, for example temperature, speed of axes of the conveying system, etc. In the figure, this sequence is arranged, for example, along the frequency axis, each marker associated to a given quantity representing its average value in a time interval that corresponds to or is shorter than the observation window of the first signal.

In variant embodiments, the sorting stage 240 may be configured to select the second processing block for processing both low-dynamic signals RI and high-dynamic signals Rf.

As exemplified in FIG. 3, the third representation stage 246 may comprise an operation of associating, for example by selecting from a reference table of digital images, or look-up table, or a database of digital images, the digital image of a (digital) icon from a set of possible icons to encode the state of configuration of the apparatus 10 in a unique way based on the values of the parameters read in a certain observation time window, for example the window K of width H used for the high-dynamic signals Rh and low-dynamic signals RI.

As a result of such a processing operation 246, it is hence possible to produce the third image Rcf for the constant-dynamic signal Rc, which comprises the sequence of icons selected to encode the data Rcf sensed in each observation window K.

In the present description, "digital icon" is meant as a numeric representation of the two-dimensional shape associated to a somewhat stylized pictogram of the element represented.

For instance, the third image may comprise a sequence of multiform icons arranged linearly.

As exemplified in FIG. 3, the enrichment stage 248 may comprise producing a composite image Rf starting from the first image Rhf, the second image RIf, and the third image Rcf, namely a matrix of transformed data.

For instance, producing a composite image Rf may comprise superimposing 248 on the first image Rhf at least one other image from between said second image RIf and said third image Rcf.

In superimposing the images Rhf, RIf, Rcf to produce the composite image Rf, the block 248 can use a position grid G, in which to arrange the at least one other image Rcf, RIf in a way aligned with the "background" image of the high-dynamic signals Rhf, for example according to a position grid G having three rows or bands.

For instance, as exemplified in FIG. 5, the composite image Rf may be produced by arranging:

in a first row G1 (for example the top row) of the position grid G, images representing constant-dynamic signals Rcf, with each icon of the sequence that refers to a different processing parameter for a given cutting operation that is under analysis, such a parameter being, for example: material, gas, thickness, type of tip, type of optical head, type of laser, type of laser machine, etc.;

in a second row G2 (for example the central row) of the position grid G, a further image comprising markers having pseudo-random shapes, which may be also themselves stored in a database or look-up table from which they can, for example be selected; the aforesaid second row G2, which is optional, presents images that do not contain information, but is basically used only to increase the spatial references available, for example in addition to the unit vectors of the cartesian axes, with respect to which it will be possible to reference locally any spatial distribution (for example, but not exclusively, of the peak values of components) of the STFT or CWT used; in other words, this second row comprises a plurality of spatial references in the form of icons that segment further the two-dimensional space, making it possible to identify a point of the image, for example, with respect to a position relative to the aforesaid spatial references; and in a third row G3 (for example the bottom row) of the position grid G, the set of images that represent transformed low-dynamic signals RIf, which comprise the sequence of marker images RIf that virtually "picture" the positions of the setting knobs of the virtual counter corresponding to the sequence of the segments RIi, for example each marker comprising a pair of knobs, for instance one for the integers and the other for the decimals, which are for example distinguished from other pairs of knobs via respective frames of irregular shape.

It is noted that the above arrangement of the images in the composite image Rf is provided purely by way of non-limiting example. In variant embodiments, the way in which the images are arranged in the grid G may be different; for example, the positions of the second and third images could be switched.

Using time windows having one and the same width H (which is the same or smaller for the second and third images RIf, Rcf), in superimposing at least one between the second and third images RIf, Rcf on the first image Rhf to produce the composite image Rf, the result is that, in the composite image, the first digital image, the second digital image, and/or the third digital image refer to one and the same window H.

For instance, as exemplified in FIG. 5, marker pairs of the second image RIf are shown, denoted by RIf1, . . . , RIf6, superimposed on the first image Rhf in the row G3, each regarding the measurement of a different quantity in the window H or in a sub-interval thereof. This measurement may be an average value in the window H of the i-th quantity represented by a marker RIfi, or else may also be a value assumed by the i-th quantity in the interval of the window H, for example half-way along the interval.

The icons of the sequence of icons of the third image Rcf in the row G1 may vary according to the window H, in the composite image Rf, even though in general, given that the icons of the row G1 encode constant state information, linked to the machine configuration or to the processing-program settings, more often than not the icons change from program to program but not during runtime of the individual processing program.

Hence, based on what has been described above the method described herein comprises in one embodiment:

sensing a set of signals R representing parameters of the industrial process via a set of sensors 30, wherein sensed signals R1, R2, R3 of the set of signals R comprise signals indicative of said industrial process that vary in time, such as the high-dynamic and low-dynamic signals, applying to one or more sensed signals R1, R2, R3 of the set of sensed signals R a classification operation, 26, to obtain at least one classification signal Q indicative of a state of said industrial process; for example, the state is the quality of the industrial process, providing the signal Q processed by the classification stage 26 to the interface unit 21 to control processing of the industrial process. Based on the classification signal provided to the processing machine, the aforesaid interface unit 21, which may be an autonomous processing module or a control sub-module in the processing module 20, is configured to carry out automatically operations such as warnings and/or alarms and/or rejection of pieces produced. These operations or part of them may also be carried out manually.

The method specifically comprises representing signals among the sensed signals R1, R2, R3 by applying a respective representation 242, 244, 246 of a set of representations 24 based on the membership of the signals among the sensed signals R1, R2, R3 in a respective subset RI, Rh, Rc defined in said set of sensed signals R, to produce corresponding digital images Rhf, Rif, Rcf that represent said sensed signals R1, R2, R3. Hence, this operation is applied to one of the signals, R1 in the example, to which the classification operation 26 is applied, whereas other signals of the set of sensed signals can be chosen—based on their features, in particular slowly varying as compared to the signal R1 or constant—for the other representation operations 244, 246.

According to the method described, at least one first representation 242 of the set of representations 24 comprises representing signals of a subset R1—for instance one of the signals, R1 in the example, to which the classification operation 26 is applied and/or a high-dynamic signal among the subsets RI, Rh, Rc—that in particular comprises signals that vary in time, namely in the example high-dynamic signals, in an observation time window, for example the window K, via a map, in which one of the dimensions represented is time, and producing a corresponding first digital image Rhf of said set of digital images Rhf, RIf, Rcf, which is the map, in particular a time-frequency map or a time-scale map.

Next, the method comprises producing at least one composite image Rf via superimposing 248 on the first digital image Rhf one or more digital images Rhf, Rcf, RIf produced by signals of other subsets, so that to the image Rhf in the form of map graphic elements are added obtained via the other representations 244, 246 that improve operation of the classification module 26.

Then, the method comprises applying, to the at least one composite image Rf, the classification operation 26 to obtain at least one classification signal Q indicative of a state of said industrial process.

The method further comprises determining the membership of the signals among the sensed signals R1, R2, R3 in a respective subset defined in said set of sensed signals R by assigning, for example via the sorting operation 240 or other routing operation, signals among the sensed signals R1, R2, R3 to respective subsets of said set of sensed signals R; namely in the set of sensed signals R, subsets RI, Rh, Rc are defined. In particular, the assignment is carried out via criteria of distinction, for example criteria of distinction based on the rapidity of variation in time of the signal in the observation window, namely high dynamic or low (or constant) dynamic, the low-dynamic signals being, for example, signals that have a prevalent frequency content at a lower frequency and possibly a limited bandwidth in the observation window.

Moreover, the method envisages that the aforesaid map in which one of the dimensions is time is obtained via a transform from the time domain to a two-dimensional domain in which one of the dimensions is time; in particular, said transform comprises at least one between a short-term Fourier transform, STFT, and a continuous-wavelet transform, CWT.

The operation of applying respective representations of the set of respective representations 242, 244, 246 to signals R1, R2, R3 in the set of sensed signals R so as to produce a respective digital image Rhf, RIf, Rcf also comprises representing 244, 246 at least one second signal R2, R3 of said set of signals R by extracting a representative value over a time interval equal to or shorter than the time window of the first signal R1 and producing at least one second digital image RIf, Rcf of said set of digital images Rhf, RIf, Rcf to produce at least one composite image Rf by superimposing 248 on said first digital image Rhf at least said second digital image Rcf, RIf. In other words, it is envisaged to superimpose graphic elements that represent a value extracted from the signal with low variation in the window 244 or from the constant signals, namely state parameters, or machine parameters, for instance where the extracted value is the constant value itself understood as numeric value or as value of the information.

According to preferred embodiments, the extraction operation comprises computing a value, in particular an average value of the signal with low variation, and/or acquiring a value of process parameter. Preferably, there is present both a representation, in particular via an indicator or marker, of the extracted value of the signal with low variation and a representation via icons that represent the value or the corresponding information of one or more process parameters.

It is moreover noted that the composite image Rf may comprise a number of composite images arranged adjacent to one another in a grid, or matrix, for example a quadrangular one, namely by forming rows and columns of adjacent composite images, where a number of composite images can be obtained by processing in parallel data received from the sensor 30 in successive processing phases (zones of interest) or different groupings of data R1, R2, R3 gathered by different types of sensors 30a, 30b, 30c, 30d of the set of sensors 30.

In this regard, FIG. 6 is exemplary the case where the composite image Rf comprises a plurality of composite images Rf1, . . . , Rf9 arranged in the form of a matrix, for example for a total of nine images, where each composite image of the plurality of composite images Rf1, . . . , Rf9 is obtained via processing by the processing stage 24 of data received from different sensors in different measurement signals R1.

In particular, as exemplified in FIG. 6:
a first digital image Rf1 is obtained by applying the first representation 242 to a signal sensed by a photodiode as first signal R1;
a second digital image Rf2 is obtained by applying the first representation 242 to a feedback signal sensed by a stand-off sensor as first signal R1;
a third digital image Rf3 is obtained by applying the first representation 242 to an acceleration-of-trajectory signal as first signal R1;
a fourth digital image Rf4 is obtained by applying the first representation 242 to a gap-sensor frequency signal, sensed by a capacitive sensor, as first signal R1;
a fifth digital image Rf5 is obtained by applying the first representation 242 to a signal of tracking error on a first axis X as first signal R1;
a sixth digital image Rf6 can be obtained by applying the first representation 242 to a signal of tracking error on a second axis Y as first signal R1,
a seventh digital image Rf7 can be obtained by applying the first representation 242 to a signal of tracking error on a third axis Z as first signal R1,
an eighth digital image Rf8 can be obtained by applying the first representation 242 to a feedback signal sensed by the gas-pressure sensor as first signal R1, and
a ninth digital image Rf9 can be obtained by applying the first representation 242 to a feedback signal sensed by a laser power sensor as first signal R1.

On each of the digital images Rf1, . . . , Rf9 there can then be superimposed further digital images obtained by applying:
the second representation 244 to average values (e.g., values calculated in successive time intervals H) of signals of temperature of the tip (feedback), gas pressure, laser power, laser pulse frequency, laser pulse duty-cycle, and average value of the signal of the photodiode as second signals R2; and
the third representation 246 to information regarding parameters of the industrial process such as type of material, type of gas, thickness of material, type of tip (nozzle), type of machine, type of laser head, type of laser, type of lens.

In this way, the digital images Rf1, . . . , Rf9 become composite images Rf1, . . . , Rf9 ready to be processed by the neural network 26.

In variant embodiments, processing by the processing stage 24 is carried out on data received from the sensor 30 in successive processing phases, as discussed previously.

As exemplified in FIG. 6, the digital images can be arranged in one and the same number of rows or columns. Alternatives are exemplified in FIGS. 8 and 9. Illustrated in FIG. 8 is an arrangement in which some of the composite images, in the figure the composite image at the centre, do not comprise a grid. In FIG. 9 the matrix has a rectangular shape, in the example with six composite images, instead of a square shape.

For instance, the composite image Rf of FIG. 5 is a portion of the image of FIG. 6.

As it may be noted, the first row G1 remains identical in so far as the plurality of composite images refers to one and the same processing program in which the configuration of the machine carrying out processing does not change.

As exemplified in FIGS. 5 and 6, the composite image Rf obtained provides a way to "integrate" the "raw" data of each high-dynamic signal Rh with the information of the low-dynamic signals RI and constant-dynamic signals Rc, thus obtaining an enrichment as compared to the time-frequency/time-scale map of the first image Rh.

In variant embodiments, the set of transformed signals may also comprise a "continuous" temporal sequence of images, namely a video. For instance, the signal representations exemplified in FIGS. 5 and 6 may correspond to frames of the above video.

The method as exemplified herein may comprise training an artificial neural-network circuit on a set of composite images Rf, or training dataset, preferably associated to a class-membership index, as also specified in what follows. Since the method described herein can perform recognition, namely the inference phase, on single composite images Rf or on a plurality of composite images that refer to different first signals R1 and are arranged for example in matrix form, for instance Rf1, . . . , Rf9, the training set may accordingly comprise single composite images or a plurality of composite images that refer to different first signals R1 and are arranged, for example, in matrix form, as in FIG. 6.

Consequently, in some embodiments, the composite image Rf represents, both in the training phase and in the inference phase, the type of input supplied to the classification processing carried out in the classification stage 26.

Hence, in general it is envisaged to apply a classification operation carried out using the pattern-recognition module 26, in particular the classification module, trained on a set of the aforesaid composite images stored in a training dataset.

Pattern-recognition processing 26, in particular artificial-convolutional-neural-network (CNN) processing, comprises computerized instruments that exploit deep-learning algorithms to carry out image-processing activities, for example recognition of objects represented within the images.

As exemplified in FIG. 7, CNN processing 26 comprises a plurality of layers, for example a first plurality of convolutional layers 26a, coupled to the input layer 260, and a second plurality of fully connected layers coupled to the first plurality 26a and to the output layer 270.

In general, the processing layers of a CNN can use up to millions of parametric values, also known as weights. The weight values are "learnt"; namely, they are pre-arranged, through a training processing phase that may imply (large) training datasets. In general, the processing layers (also referred to as hidden layers) are configured to apply data processing to a tensor of images received thereby through a training phase, which can be performed in a supervised way or not, according to error-minimization targets.

As discussed herein, a CNN apt for classification processing 26 can be trained to provide a processed output signal Q using as training data one or more training datasets stored in a database, for example in a server SV.

As exemplified in FIG. 7, the convolutional processing layers 26a may comprise, for example, convolutional processing layers 262 and/or pooling processing layers 264, where:

the convolutional processing layers 262 execute convolution of the image data at input with filters, also known as convolution kernels, and apply an activation function to the convoluted data, to produce, as a result, a set of features; and the pooling processing layers 264 reduce the dimensions of the set of features by carrying out sub-sampling, for example, maximum or medium sampling.

In one or more embodiments, the processing layers 260, 262, 264, 265, 267, 269, 270 may have a multilayer perceptron (MLP) architecture comprising a plurality of processing units referred to as perceptrons.

A single i-th perceptron of the plurality of perceptrons may be identified by a tuple of values comprising weight values $w_i$, offset values $b_i$, and an activation function $p_i$.

As exemplified in FIG. 7, a convolutional processing layer, like the one denoted by 262 (taken as an example of the various layers), comprises at least one convolution kernel (matrix) $w_i$, for example a filter of size 3×3.

A convolutional layer such as 262 (once again taken as a possible example) may be configured to apply an activation function on a cross correlation (sliding dot product).

Such an operation may be expressed, for example, as follows:

$$b = p\!\left(w_i^T \cdot a\right)$$

where:

$$w_i^T$$

is a transposed version of the weight vector $w_i$ (corresponding to the kernel), a is the input feature vector, e.g., calculated by a processing layer (not illustrated), which precedes the one considered 262, for example a 32-point vector;

$p$ is the activation function of the layer 262; and b is the output resulting from application of the activation function p to the product of the kernel by the input feature vector.

As exemplified in FIG. 7, the fully connected processing layers 26b may comprise, in addition to an output layer, a flattening layer 265 and at least one dense layer 267, 269, where:

the flattening layer 265 is configured to convert the data processed by convolutional processing 26a and reducing them to a one-dimensional vector so as to create a single long feature vector; and the at least one dense layer 269 is configured to apply a linear combination of inputs and outputs via weight values and to apply a (for example non-linear) activation function to the above linear combination.

In other words, the features are "merged" in a synthetic way in a vector and processed to provide the pattern-recognition signal Q, in particular a classification signal.

In some embodiments, it has been found that convolutional neural networks contained in a development library known by the name of Keras, such as Inception V3 and Xception, are apt to processing/classifying the transformed data Rf, as are likewise networks such as those known by the names of ResNet50, VGG16, VGG19 and MobileNet; in other embodiments, simpler architectures yield satisfactory results.

Hence, advantageously, the method described carries out, based on sensed signals, a recognition of patterns regarding a state of the industrial process or of the product of processing by exploiting artificial neural networks that operate on images.

In particular, the method described reduces margins of error of the artificial neural networks that, operating on images, can identify as being the same peak or the same features peaks or features generated by phenomena that are different but that have a similar form, this being obtained by superimposing marker values and images that represent the state on the two-dimensional maps of the signal to be processed so as to introduce differences in the images that aid artificial-neural-network processing.

In addition, the spatial arrangement of the further superimposed images provides a further reference for artificial-neural-network processing.

In a first embodiment, the CNN in the pattern-recognition stage 26 is configured to provide the recognition signal Q as signal of classification of the processing obtained from the industrial process. To this end:

the output stage 270 is set so as to have an activation function of the softmax type in a way in itself known; and the CNN is trained using as training data a plurality of composite images Rf supplied by the processing stage 24 and classified in respective categories corresponding to the quality of processing and/or of the industrial process, for example with supervised training.

In variant embodiments, the pattern-recognition stage 26 may be configured, via training with a respective training dataset, to provide one or more recognition signals Q as values of a regression, for example through an estimation of a metrological characterization of a product of processing: in particular, the signal Q can provide an estimate of a value of roughness, optionally normalized, of at least part of the product of processing.

It may be noted in this regard that in general, from the standpoint of pattern recognition, a classification operation and a regression operation are distinguished by the fact that classification operates on discrete information, providing at output, for example, classes, whereas regression operates on continuous values.

Hence, in a second embodiment, the CNN in the pattern-recognition stage 26 is configured to provide the signal Q as regression signal of parameters of the processing obtained from the industrial process. To this end:

the output stage 270 is set so as to have an activation function of the rectified-linear-unit (ReLu) type, in a way in itself known; and the CNN is trained using as training data a plurality of images obtained, for example, with an optical measuring instrument that enables metrological characterization of the specimens of cutting; in particular, a roughness value supplied by the measuring instrument (with which the various specimens of cutting should be characterized) can provide the training feedback of the model.

In this second embodiment, as has been said, the signal Q supplied in the inference phase could be an estimate of roughness of processing carried out via the industrial process.

In various embodiments, the method may comprise data-collection operations for supervised training of the CNN of the pattern-recognition stage 26.

The Inventors have noted that, starting from the acquisitions of the dimensions on the axes, it is possible to draw the profiles cut and select, on each profile, one or more portions (or segments) of the end product, for example of a metal sheet that has been cut: according to the selection made, it is possible to trace back to what are the start and end of the processing time interval in which the specific portion of product has been machined. By exploiting this observation, it is possible to obtain portions of signals sensed by sensors 30 that correspond to the time interval in which the portion of product that is to be analyzed has been obtained.

Consequently, by extracting a portion of signal R1, R2, R3 in the corresponding time interval for each signal of the set of sensed signals R (in particular, given that the signals are synchronous with one another), each portion of signal R1, R2, R3 can thus be processed in the processing module 24, to generate a multiplicity of composite images Rf1, . . . , Rf9, for example as a function of the size of the portion of signal analyzed.

Each portion of signal, corresponding to a respective portion on the drawing of the product (e.g., of the profile cut) is easy to localize and inspect on the specimens cut and can be labelled in terms, for example, of binary judgement—good/bad—of the cutting quality or else of any metrological scalar quantity, such as the roughness measured under an electron microscope.

As regards the pattern-recognition procedure, it is emphasized how, in the training phase of the recognition model implemented by the stage 26, an operation of labelling with a label, for example of a string type and a binary type, facilitates obtaining a training set for the neural network that will provide a classification signal. The training dataset obtained using this first labelling operation may hence comprise "composite image"/"label of the membership class" pairs with which to train the neural network. The labels, for example to classify the processing quality, comprise strings such as 'good', 'bad' or binary codes 0, 1.

As an alternative, in the case of pattern recognition that performs a regression, a second operation of labelling with a label corresponding to the class of regressions facilitates training of the CNN to infer a scalar index or value (in the example considered, a roughness) instead of the index of membership in a class.

The training dataset obtained using this second labelling operation may thus comprise "composite image"/"scalar index of quality" pairs. Hence, the method described herein also envisages that the pattern-recognition stage 26 will operate based on a classification model, in particular implemented via a CNN, trained based on a set of composite images Rf, in particular there being associated, to these composite images of said training dataset in the server SV, corresponding class membership indexes, in the specific example a quality class, which may, for example, have been entered by a technical expert. Hence, more in general, in the case of classification, the training dataset comprises composite images associated to a state or class indication corresponding to the composite image.

In variant embodiments, the method also envisages that the pattern-recognition stage will operate based on a regression model, in particular implemented via a CNN, trained based on a set of composite images Rf, in particular these composite images being associated, in said training dataset in the server SV, to corresponding scalar indexes—for example, scalar quantities measured from the process or from the product and referring to the process to which the composite image, such as the roughness of the cut, refers that corresponds to a class, in the specific example a quality class—which may, for example, have been entered by a technical expert; namely the pattern-recognition operation 26 is an operation of regression, and said property of said industrial process is a value representing said industrial process, in particular an estimate of a measurement made on the industrial process or on its product. Hence, more in general, in the case of regression, the training dataset comprises composite images associated to values of measurements made on the industrial process (or on its product) corresponding to the composite image.

It is noted that, also starting from the acquisitions themselves, it is possible to generate different composite images, and hence different training datasets, so that on the one hand there is the tendency to insert into the composite image a multiplicity of signals, leaving to deep-learning on the images (in practice to the minimization of the target function through back-propagation) the task of exploring and weighing the possible "correlations" of the various data with the target function itself, whereas on the other hand there is the attempt to reduce the size of the images at input in order to reduce the computational complexity.

In various embodiments, it is possible to adjust, also manually, a heat-map (map of activations) of the CNN, retaining the most significant values.

Without prejudice to the underlying principles, the details and the embodiments may vary, even appreciably, with respect to what has been described herein purely by way of example, without thereby departing from the sphere of protection and scope of the invention, as defined by the annexed claims.

The invention claimed is:

1. A method of monitoring the state of industrial processing processes carried out by processing machines, in particular laser processing machines, the method comprising:

sensing a set of signals representative of industrial process parameters via a set of sensors, wherein sensed signals of the set of signals comprise signals indicative of said industrial process that vary over time, applying a classification operation to one or more sensed signals of the set of sensed signals, obtaining as a result at least one classification signal indicative of a state of said industrial process, providing said at least one classification signal to an interface unit to control the state of processing of said industrial process, representing signals among the sensed signals, applying a respective representation of a set of representations based on membership of the signals among the sensed signals to a respective subset of signals defined in said set of sensed signals to produce corresponding digital images that represent said sensed signals, at least one first representation of the set of representations comprising representing signals of a first subset of signals including signals that vary in time in an observation time window, via a map in which one of the dimensions represented is time, and producing a corresponding first digital image of said set of digital images;

producing at least one composite image via adding to, in particular via superimposing on, said first digital image one or more digital images produced by signals of other subsets of signals; and applying said classification operation to said at least one composite image, obtaining at least one classification signal indicative of a state of said industrial process as a result of said classification operation;

wherein said operation of representing further comprises:

representing at least one second signal of said set of signals by extracting a representative value over a time interval equal to or shorter than the time window of the first signal and producing at least one second digital image of said set of digital images, in particular via an indicator element that indicates a value of measurement on a scale representative of a respective measurement range; and producing at least one composite image via adding to, in particular via superimposing on, said first digital image at least said second digital image.

2. The method according to claim 1, wherein said operation of representing signals of a subset of signals, in particular including signals varying over time in an observation time window, via a map in which one of the dimensions represented is time, and producing a corresponding first digital image of said set of digital images comprises performing a transform from the time domain to a two-dimensional domain in which one of the dimensions is time, in particular said transform comprising at least one of a short-term Fourier transform, STFT, and a continuous-wavelet transform, CWT.

3. The method according to claim 1, wherein said operation of extracting a representative value comprises computing a value, in particular an average value, and/or acquiring a state-parameter value.

4. The method according to claim 3, wherein an operation of representing a second signal of said set of signals, extracting a representative value over a time interval equal to or shorter than the time window of representation of the first signal and producing a second digital image of said set of digital images comprises:

computing an average value of said second signal of the set of sensed signals over said time interval;

computing a measurement range of said second signal of the set of sensed signals over said time interval; and producing a second digital image of said set of digital images, said second digital image representing said calculated average value via an indicator element that indicates a value of measurement on a scale representative of said measurement range, in particular, said operation of computing a measurement range comprising applying a congruence modulo N operation to the calculated average value, with N equal to the maximum value of the time series of data of the sensed signal, to obtain a pointer of a counter having a full scale substantially equal to the value of the modulo N of the congruence modulo N operation, and said operation of producing a second digital image comprising producing a second digital image of said set of digital images indicative of at least one position of said pointer on said counter.

5. The method according to claim 4, wherein producing said second digital image of said set of digital images comprises associating to said indicator element a digital frame having a respective asymmetrical shape to identify uniquely the time series of data of said sensed signal of which said average value is calculated.

6. The method according to claim 4, wherein:

said operation of representing a first signal comprises operating on an observation window defined at least by a parameter of observation-time-window function and a parameter of observation-time-window width; and said operation of representing at least one second signal of said set of signals comprises segmenting the respective signals, applying thereto an observation moving time window having a size equal to the parameter of observation-time-window width to obtain a plurality of segments of time series of signal data.

7. The method according to claim 1, wherein said operation of representing at least one second signal of said set of signals, extracting a representative value over a time interval equal to or shorter than the time window of the first signal, comprises:

providing a set of digital icons; and associating at least one digital icon of said set of digital icons to said extracted representative value to produce a third digital image.

8. The method according to claim 1, comprising:

producing a plurality of said composite images;

arranging said plurality of composite images in an overall single digital composite image, in particular arranging them adjacent to one another according to a grid or matrix arrangement; and applying said classification operation to said overall composite image, obtaining as a result said at least one classification signal indicative of a state of said industrial process.

9. The method according to claim 1, wherein determining the membership of the signals among the sensed signals in a respective subset of signals defined in said set of sensed signals comprises assigning the signals among the sensed signals to said respective subsets, in particular making the assignment via criteria of distinction, such as criteria of distinction based on the rapidity of temporal variation of the signal in the observation window.

10. The method according to claim 1, wherein said classification signal indicative of a state of said industrial process indicates a class of quality of the industrial processing process, and wherein the method comprises providing said at least one classification signal to an interface to control of the processing quality of said industrial process.

11. The method according to claim 1, wherein said classification operation comprises artificial-convolutional-neural-network (CNN) processing.

12. The method according to claim 11, wherein said CNN is trained on a set of composite images stored in a training dataset, in particular said composite images being associated, in said training dataset, to corresponding class membership indexes.

13. An apparatus for carrying out industrial processing processes, the apparatus comprising:

a mobile structure moveable according to one or more axes;

an end effector coupled to said mobile structure and having a distal end facing a work region;

a set of sensors coupled to said apparatus; and a processing system coupled to said set of sensors and configured to execute the method according to claim 1.

14. The apparatus according to claim 13, wherein the sensors belonging to the set of sensors are configured to provide as output one-dimensional signals, in particular representative of raw data, that is data sensed but not processed.

15. The apparatus according to claim 13, comprising a processing machine configured to carry out industrial laser processing, preferably laser cutting, processes, wherein said end effector is configured to direct, via said distal end, a laser beam emitted by a laser source towards said work region.

16. A computer program product loadable into the memory of at least one processing system and including software code portions for executing the operations of the method according to claim 1 when the product is run on at least one processing system.

* * * * *